Patented May 14, 1935

2,001,145

UNITED STATES PATENT OFFICE 2,001,145

ART OF RIVETING

Albert L. Lambert, Narberth, and William J. Meinel, Philadelphia, Pa., assignors to Heintz Manufacturing Company, Philadelphia, Pa., a corporation of Pennsylvania Application January 29, 1934, Serial No. 708,731

1 Claim. (Cl. 78—46)

This invention relates to the art of riveting, and more particularly to a rivet and to the manner of its application.

In the riveting of sheet steel of very high tensile strength it is necessary to use rivets of especially strong material in order to give proper strength to the riveting, but due to the characteristics of such rivet material the heading up of such rivets is impossible or impractical.

The principal object of this invention is to provide a rivet having a body of very strong material, and a rivet which does not require the body of the rivet to be headed up, and a rivet that can be employed for riveting easily and economically, and a rivet that when used to rivet sheet steel of very high tensile strength, or to rivet other materials, gives the proper strength to the riveted portions, and a rivet that is simple and inexpensive, and practical and efficient from both the commercial and the engineering standpoint.

A further object of this invention is to provide a method of riveting sheet steel of very high tensile strength, or other materials, with rivets of very strong material and without heading up the material of the rivet, and a method of riveting which is simple and efficient, and a method of riveting sheet steel of very high tensile strength, or other materials, which gives proper strength to the riveted areas.

Other objects of this invention will be in part obvious and in part pointed out hereinafter.

In accordance with this invention the riveting is accomplished by extending the shank of a headed rivet of very strong material through suitable rivet holes in the material to be riveted and then applying a ferrule or collar over the protruding end of the rivet and then compressing the material of the ferrule or collar into an annular groove in the end of the rivet. The act of compressing the collar into the rivet pin groove works the material of the collar to such an extent that it gives the material high tensile strength.

In order that a clearer understanding of this invention may be had, attention is hereby directed to the accompanying drawing forming a part of this application and illustrating certain possible embodiments of this invention, and in which.

Similar reference characters refer to similar parts throughout the several views of the drawing.

Figure 1:
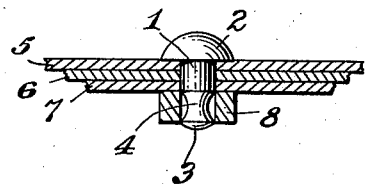
Fig. 1 is a sectional view showing a rivet embodying this invention positioned in rivet holes of elements to be riveted thereby with the rivet collar in position on the rivet pin but not closed thereon.
Figure 2:
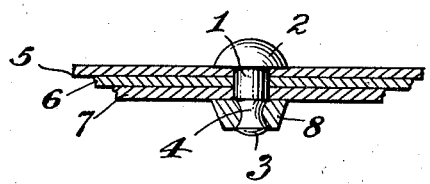
Fig. 2 is a view similar to Fig. 1, but showing the rivet collar closed upon the rivet pin and the rivet in final position on the parts riveted thereby.
Figure 3:
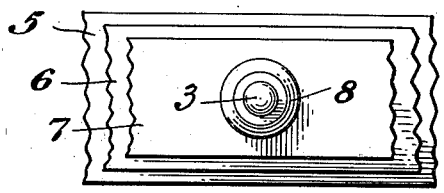
Fig. 3 is a bottom plan view of the assembly shown in Fig. 2.

As illustrated in the drawing, and to which reference is now made, the rivet pin consists of very strong material. We have found what is commonly known as high tensile strength 18—8 stainless steel (a chrome steel), or what is known as high tensile strength corrosion resisting steel satisfactory. Our invention, however, contemplates rivet pins of any material having the proper strength for riveting of sheet steel having very high tensile strength. It is contemplated that the tensile strength of such sheet steel may be approximately 125,000 pounds per square inch.

The rivet pin comprises a shank 1, a head 2, and an end 3 which has an annular groove 4 intermediate its extremity and the shank portion 1. The extremity of end 3 may be rounded, as shown, if desired, and of approximately the same diameter as the shank 1.

To rivet with a rivet embodying our invention the shank of the rivet is passed through rivet holes in the members to be riveted, such as steel plates 5, 6 and 7, so that the head 2 of the rivet seats against one side of these plates and the end 3 and its groove 4 protrudes from the other side. A collar 8 is then passed over the end 3 of the rivet pin and seated against the adjacent face of the plates. Then the material of the collar 8 is compressed against the end of the rivet pin so that the material of the collar is compressed into the annular groove 4, preferably filling this groove completely. The material of the collar 8 is of such character that it is not only capable of being compressed into the groove 4 but also is preferably of such character that the incident working of the material converts it to high tensile strength, and preferably to a tensile strength nearly as high as the tensile strength of the material of the rivet pin. We have found what is commonly known as soft 18—8 stainless steel or a soft corrosion resisting steel satisfactory, although our invention is not necessarily limited to these specific materials. Any other specific materials having the characteristics stated may be used. The collar 8 may be closed on the rivet pin so as to enter the groove 4 by means of a rivet set used in an ordinary air gun or otherwise, or by means of any other suitable tool. Heating of the rivet pin or collar is not required.

With a rivet of the character described it is preferable that the diameters of the rivet holes and rivet shank be such that the rivet shank fits the rivet holes snugly.

From the above it will be apparent that by providing a rivet pin of high tensile strength material and closing the rivet on the riveted parts by means of a closing member of high tensile strength material, the riveting is adequately strong even when applied to very high tensile strength material, and the rivet and the manner of application is simple, economical and efficient.

As many different variations may be made in the configuration of the rivet pin and closing member and in the manner of applying the rivet pin to the parts to be riveted and in the manner of closing the closing member on the riveted parts and of working the material of the closing member to increase its tensile strength, without departing from this invention, it is understood that all matter contained in the above description as shown in the accompanying drawing be interpreted as illustrative and not in a limiting sense.

What we claim is:

Riveting of the character described which includes placing a washer of chrome steel about an annular curved groove provided adjacent one end of a rivet pin protruding from the parts to be riveted, the washer being substantially the same width as the groove, and cold working the washer to flow the washer as a whole to fill the groove and into tight contact with the parts to be riveted, the said working being sufficient to substantially increase the tensile strength of the washer.

ALBERT L. LAMBERT.
WILLIAM J. MEINEL.